US008743795B2

(12) United States Patent
Yu et al.

(10) Patent No.: US 8,743,795 B2
(45) Date of Patent: Jun. 3, 2014

(54) DETECTION TIME OF SEMI-PERSISTENT SCHEDULING ACTIVATION/RECONFIGURATION SIGNALING

(75) Inventors: Yi Yu, Irving, TX (US); James E. Womack, Irving, TX (US); Zhijun Cai, Irving, TX (US)

(73) Assignee: BlackBerry Limited, Waterloo, Ontario (CA)

(*) Notice: Subject to any disclaimer, the term of this patent is extended or adjusted under 35 U.S.C. 154(b) by 790 days.

(21) Appl. No.: 12/562,973

(22) Filed: Sep. 18, 2009

(65) Prior Publication Data

US 2010/0074206 A1    Mar. 25, 2010

Related U.S. Application Data (60) Provisional application No. 61/098,549, filed on Sep. 19, 2008.

(51) Int. Cl.
H04W 72/00    (2009.01)
H04B 7/00     (2006.01)
H04W 4/00     (2009.01)

(52) U.S. Cl.
USPC ........... 370/329; 370/328; 370/346; 455/450; 455/509

(58) Field of Classification Search
USPC .......................................................... 370/329
See application file for complete search history.

(56) References Cited

U.S. PATENT DOCUMENTS

| | | | |
|---|---|---|---|
| 2005/0078651 A1* | 4/2005 | Lee et al. | 370/349 |
| 2005/0083943 A1* | 4/2005 | Lee et al. | 370/395.4 |
| 2008/0232284 A1* | 9/2008 | Dalsgaard et al. | 370/310 |
| 2008/0267118 A1* | 10/2008 | Cai et al. | 370/329 |
| 2008/0293426 A1 | 11/2008 | Kim et al. | |
| 2009/0154417 A1* | 6/2009 | Wu et al. | 370/329 |
| 2009/0168731 A1* | 7/2009 | Zhang et al. | 370/336 |
| 2009/0175159 A1* | 7/2009 | Bertrand et al. | 370/203 |
| 2009/0180427 A1* | 7/2009 | Kuo | 370/328 |
| 2009/0197589 A1* | 8/2009 | Kitazoe | 455/422.1 |
| 2009/0197610 A1* | 8/2009 | Chun et al. | 455/450 |
| 2009/0203376 A1* | 8/2009 | Sambhwani et al. | 455/434 |
| 2009/0207794 A1* | 8/2009 | Meylan | 370/329 |
| 2009/0232054 A1* | 9/2009 | Wang et al. | 370/328 |
| 2009/0280798 A1* | 11/2009 | Meylan et al. | 455/422.1 |
| 2010/0040028 A1* | 2/2010 | Maheshwari et al. | 370/336 |
| 2010/0067457 A1* | 3/2010 | Wang et al. | 370/329 |
| 2010/0074206 A1* | 3/2010 | Yu et al. | 370/329 |
| 2010/0077100 A1* | 3/2010 | Hsu et al. | 709/234 |

(Continued)

FOREIGN PATENT DOCUMENTS

WO    2007073118 A1    6/2007

OTHER PUBLICATIONS

Office Action issued in Chinese Application No. 200980150392.7 on Jul. 24, 2013; 8 pages.*

(Continued)

Primary Examiner — Jenee Williams
(74) Attorney, Agent, or Firm — Fish & Richardson P.C.

(57) ABSTRACT

A method is provided for improving reliability in detection of an identifier for a user agent is provided. The method includes the user agent attempting to decode semi-persistent scheduling activation/reconfiguration signaling over a physical downlink control channel only during a discontinuous reception (DRX) on-duration.

6 Claims, 6 Drawing Sheets

(56) References Cited

U.S. PATENT DOCUMENTS

| | | | | |
|---|---|---|---|---|
| 2010/0118787 | A1* | 5/2010 | Yano et al. | 370/328 |
| 2010/0189022 | A1* | 7/2010 | Pelletier et al. | 370/311 |
| 2010/0255850 | A1* | 10/2010 | Kaukoranta et al. | 455/450 |
| 2011/0002262 | A1* | 1/2011 | Wang et al. | 370/328 |
| 2011/0083066 | A1* | 4/2011 | Chung et al. | 714/807 |
| 2011/0176513 | A1 | 7/2011 | Yi et al. | |
| 2011/0199984 | A1* | 8/2011 | Umesh et al. | 370/329 |

OTHER PUBLICATIONS

Office Action issued in Chinese Application No. 200980150392.7 on Dec. 26, 2013; 9 pages.*
Office Action issued in Japanese Application No. 2011-528013 on Oct. 21, 2013; 7 pages.*
Notice of Allowance issued in Japanese Application No. 2011-540956 on Jan. 10, 2014; 3 pages.—no translation.*
3GPP TS 36.321 v8.3.0; 3rd Generation Partnership Project; Technical Specification Group Radio Access Network; Evolved Universal Terrestrial Radio Access (E-UTRA) Medium Access Control (MAC) Protocol Specification; Release 8; Sep. 2008; 36 pgs.
PCT International Search Report; PCT Application No. PCT/US2009/057559; Dec. 28, 2009; 6 pgs.
PCT Written Opinion of the International Searching Authority; PCT Application No. PCT/US2009/057559; Dec. 28, 2009; 7 pgs.
Research in Motion Limited; TSG-RAN WG2 #63; Title: Reliability Analysis of UL SPS Activation Signalling; R2-084314; Jeju, Korea; Aug. 18-22, 2008; 3 pgs.
Interdigital; 3GPP TSG RAN WG2 #63; Title: CQI Reporting and PDCCH Reception During DRX; R2-084080; Jeju, Korea; Aug. 18-22, 2008; 6 pgs.
Sunplus mMOBILE Inc.; 3GPP TSG-RAN WG2 Meeting #62bis; Title: Impact of Semi-persistent Scheduling on DRX Active Time; R2-083431; Warsaw, Poland; Jun. 30-Jul. 4, 2008; 4 pgs.
Ericsson; TSG-RAN WG2 Meeting #62; Title: Remaining Issues in Semi Persistent Scheduling; R2-082153; Kansas, US; May 5-9, 2008; 2 pgs.
Nokia Corporation; 3GPP TSG-RAN WG2 Meeting #62; Title: Persistent Scheduling for DL; R2-082302; R2-081542; Kansas City, USA; May 5-9, 2008; 6 pgs.
Ericsson; 3GPP TSG-RAN WG2 #61 bis; Title: SR Triggering in Relation to Uplink Grants; R2-081468; Shenzhen, China; Mar. 31-Apr. 4, 2008; 3 pgs.
Research in Motion Limited; 3GPP TSG-RAN-WG2 Meeting #61; Title: Various Issues Regarding SR Channel Handling (UL Semi-persistent Scheduling Request, DRX . . . ); R2-080811; Sorrento, Italy; Feb. 11-15, 2008; 2 pgs.
Catt; Title: Process ID Allocation for Downlink Persistent Scheduling; R2-080719; Feb. 11, 2008; 5 pgs.
Nortel; 3GPP TSG RAN WG2 #60; Title: HARQ Process ID's for DL Persistent Scheduling;R2-075153; Jeju, South Korea; Nov. 5-9, 2007; 5 pgs.
NTT DoCoMo, Inc., NEC; 3GPP TSG RAN WG2 #59bis; Title: Buffer Status Report and Scheduling Request Triggers; R2-074173; Shanghai, China; Oct. 8-12, 2007; 4 pgs.
Research in Motion Limited; 3GPP TSG-RAN-WG2 Meeting #59; Title: Semi-Persistent Scheduling and DRX Control; R2-073245; Athens, Greece; Aug. 20-24, 2007; 5 pgs.
Qualcomm Europe; 3GPP TSG-RAN WG2 #60bis; Title: BSR Triggers; R2-080375; Sevilla, Spain; Jan. 14-18, 2007; 3 pgs.

Nokia; 3GPP TSG-RAN WG2 Meeting #52; Title: Buffer Reporting for E-UTRAN; R2-060829; Athens, Greece; Mar. 27-31, 2006; 5 pgs.
3GPP TS 36.300 v8.5.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2; Release 8; May, 2008; 134 pgs.
ETSI MCC; TSG-RAN Working Group 2 Meeting #63bis; Title: Report of 3GPP TSG RAN WG2 Meeting #63; R2-085971; Prague, Czech Republic; Oct. 18-22, 2008; 156 pgs.
PCT International Preliminary Report on Patentability; PCT Application No. PCT/US2009/057559; Jan. 13, 2011; 8 pgs.
3GPP TS 36.213 V8.3.0 (May 2008); "3rd Generation Partnership Project; Technical Specification Group Radio Access Network; Evolved Universal Terrestrial Radio Access (E-UTRA); Physical Layer Procedures (Release 8)"; 3GPP Organizational Partners; May 2008; 45 pages.
Research in Motion Limited; "Detection Time of SPS Activation/Reconfiguration Signaling"; TSG-RAN WG2 #63bis; R2-085438; Prague, Czech Republic; Sep. 29-Oct. 3, 2008; 2 pages.
3GPP TSG RAN WG2 #63bis; Agenda Proposal; R2-084940 Prague, Czech Republic; Sep. 23-Oct. 3, 2008; 8 pages.
International Search Report and Written Opinion of the International Searching Authority issued in International Application No. PCT/US2009/067916 on Jul. 19, 2010; 11 pages.
International Preliminary Report on Patentability issued in International Application No. PCT/US2009/067916 on Jun. 30, 2011; 9 pages.
Office Action issued in U.S. Appl. No. 12/637,461 on Dec. 21, 2011; 14 page.
Office Action issued in Korean Application No. 10-2011-7016235 on Sep. 27, 2012; 11 pages.
Office Action issued in U.S. Appl. No. 12/637,461 on Dec. 21, 2011; 14 pages.
Office Action issued in U.S. Appl. No. 12/637,461 on May 7, 2012; 14 pages.
Advisory Action issued in U.S. Appl. No. 12/637,461 on May 31, 2012; 3 pages.
Notice of Allowance issued in U.S. Appl. No. 12/637,461 on Sep. 4, 2012; 8 pages.
Office Action issued in U.S. Appl. No. 13/244,833 on Nov. 17, 2011; 13 pages.
Office Action issued in U.S. Appl. No. 13/244,833 on May 1, 2012; 11 pages.
Notice of Allowance issued in U.S. Appl. No. 13/244,833 on Jul. 30, 2012; 7 pages.
Office Action issued in Japanese Application No. 2011-540956 on Feb. 15, 2013; 13 pages.
Office Action issued in Japanese Application No. 2011-528013 on Feb. 7, 2013; 5 pages.
Office Action issued in Mexican Application No. MX/a/2011/006039 on Oct. 11, 2012; 4 pages.
Office Action issued in Canadian Application No. 2,746,954 on May 31, 2013; 3 pages.
Office Action issued in Canadian Application No. 2,737,793 on Jun. 5, 2013; 4 pages.
Office Action issued in Chinese Application No. 200980146036.8 on Jul. 2, 2013; 15 pages.
Office Action issued in Japanese Application No. 2011-540956 on Jul. 12, 2013; 5 pages.
Notice of Allowance issued in Mexican Application No. MX/a/2011/006039 on May 9, 2013; 1 pages.

* cited by examiner

DETECTION TIME OF SEMI-PERSISTENT SCHEDULING ACTIVATION/RECONFIGURATION SIGNALING

CROSS-REFERENCE TO RELATED APPLICATIONS

The present application claims priority to U.S. provisional patent application No. 61/098,549, filed Sep. 19, 2008, by Yi Yu et al, entitled "Detection Time of Semi-Persistent Scheduling Activation/Reconfiguration Signaling", which is incorporated by reference herein as if reproduced in its entirety.

BACKGROUND

As used herein, the terms "user agent" and "UA" can refer to wireless devices such as mobile telephones, personal digital assistants, handheld or laptop computers, and similar devices that have telecommunications capabilities. Such a UA might consist of a wireless device and its associated Universal Integrated Circuit Card (UICC) that includes a Subscriber Identity Module (SIM) application, a Universal Subscriber Identity Module (USIM) application, or a Removable User Identity Module (R-UIM) application or might consist of the device itself without such a card. The term "UA" may also refer to devices that have similar wireless capabilities but that are not transportable, such as telephones, desktop computers, set-top boxes, or network nodes. When a UA is a network node, the network node could act on behalf of another function such as a wireless device and simulate or emulate the wireless device. For example, for some wireless devices, the IP (Internet Protocol) Multimedia Subsystem (IMS) Session Initiation Protocol (SIP) client that would typically reside on the device actually resides in the network and relays SIP message information to the device using optimized protocols. In other words, some functions that were traditionally carried out by a wireless device can be distributed in the form of a remote UA, where the remote UA represents the wireless device in the network. The term "UA" can also refer to any hardware or software component that can terminate a SIP session.

In traditional wireless telecommunications systems, transmission equipment in a base station transmits signals throughout a geographical region known as a cell. As technology has evolved, more advanced network access equipment has been introduced that can provide services that were not possible previously. This advanced network access equipment might include, for example, an enhanced node B (eNB) rather than a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS). As used herein, the term "access device" will refer to any component, such as a traditional base station or an LTE eNB, that can provide a UA with access to other components in a telecommunications system.

For packet data, the signal that carries data between a UA and an access device can have a specific set of frequency, time, and coding parameters and other characteristics that might be specified by the access device. A connection between a UA and an access device that has a specific set of such characteristics can be referred to as a resource. An access device typically establishes a different resource for each UA with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

According to one embodiment, a method for improving reliability in detection of an identifier for a user agent is provided. The method includes the user agent attempting to decode semi-persistent scheduling activation/reconfiguration signaling over a physical downlink control channel only during a discontinuous reception/transmission on-duration.

In another embodiment, a user agent is provided. The user agent includes a component configured to attempt to decode semi-persistent scheduling activation/reconfiguration signaling over a physical downlink control channel only during a discontinuous reception/transmission on-duration.

In another embodiment, a method for improving reliability in detection of an identifier for a user agent is provided. The method includes the user agent stopping attempting to decode semi-persistent scheduling activation/reconfiguration signaling over a physical downlink control channel when an uplink semi-persistent scheduling resource being used by the user agent is released.

In another embodiment, a user agent is provided. The user agent includes a component configured to stop attempting to decode semi-persistent scheduling activation/reconfiguration signaling over a physical downlink control channel when an uplink semi-persistent scheduling resource being used by the user agent is released.

In another embodiment, a user agent and method are provided for improving reliability in detection of an identifier for a user agent. The method includes receiving discontinuous reception cycle information, sending a buffer status report, and attempting to detect semi-persistent scheduling (SPS) activation/reconfiguration signaling over a physical downlink control channel only after the buffer status report is sent.

In another embodiment, an access device and method for improving reliability in signaling an identifier is provided. The method includes sending discontinuous reception cycle information, receiving a buffer status report, and transmitting a semi-persistent scheduling (SPS) activation/reconfiguration signaling over a physical downlink control channel only after receipt of the buffer status report.

During a voice session between a UA and an access device, talk spurts can alternate with silence periods. When a talk spurt ends and a silence period begins on the uplink, the UA typically stops transmitting in the uplink resource that the UA had been using. On the downlink, the UA typically stops receiving in the downlink resources that the UA has been assigned. When the UA stops transmitting in the uplink resource, the access device can then grant the resource to another UA. The releasing of the resource can be initiated by the UA or by the access device. When the silence period ends and a new talk spurt begins on the uplink, the UA may request that the access device grant the UA a new uplink resource on which to resume transmitting data packets. On the downlink, the access device grants the UA a new downlink resource on which to resume receiving data packets.

In a procedure known as semi-persistent scheduling (SPS) or configured scheduling, a resource for a data packet is granted and then substantially the same resource is periodically used for subsequent data packets. That is, in semi-persistent scheduling, the resource that an access device provides for data packets on an uplink or downlink is allocated at regular intervals based on a grant and/or a single scheduling request. An original grant of an SPS resource can be referred to as SPS activation. If, at a subsequent time, an access device needs to reallocate an SPS resource with different parameters, the subsequent grant can be referred to as SPS reconfiguration.

An access device typically grants an uplink or downlink resource to a UA by sending SPS activation/reconfiguration signaling to the UA over the physical downlink control channel (PDCCH). The period of time during which the UA listens on the PDCCH and attempts to decode data received on the PDCCH can be referred to as the active time (TS 36.321). The SPS activation/reconfiguration signaling might be only a portion of the data that the UA typically listens for and attempts to decode during the active time. When a UA is not in the active time, the UA may not receive the data from the access device.

A period of time known as a discontinuous reception (DRX) on-duration can be defined as a periodic duration during which the UA wakes up for the purpose of monitoring the PDCCH. The length of DRX on-duration is controlled by an on-duration timer. A DRX cycle is a periodic repetition of the DRX on-duration followed by a possible period of inactivity (i.e., a DRX off-duration). For example, the DRX cycle might be defined to last 20 milliseconds, and the DRX on-duration might be defined to be 4 milliseconds within those 20 milliseconds. If no other activity is going on, the UA will wake up to monitor the PDCCH for 4 milliseconds and then sleep for 16 milliseconds. In this case, the active time and the DRX on-duration have the same length. However, in some cases, the actual time that UA monitors the PDCCH (the active time) may need to be extended beyond the DRX on-duration. For example, if an inactivity timer is running at the end of the DRX on-duration or if the UA is awaiting a possible retransmission at the end of the DRX on-duration, the active time could be extended beyond the predefined DRX on-duration. For instance, during one DRX cycle, the UA may need to monitor the PDCCH for more than 4 milliseconds, for example, 18 milliseconds. In this case, the UA would sleep for only 2 milliseconds. The active time would be 18 milliseconds, but the DRX on-duration would remain the previously defined 4 milliseconds.

The PDCCH can include a cell radio network temporary identifier (CRNTI), an SPS RNTI, or a similar identifier, that specifies the UA for which the uplink resource is granted. A UA typically monitors or decodes the PDCCH payloads throughout the active time to determine if one of the PDCCH payloads contains an identifier addressed to that UA. As used herein, the term "payload" might refer to any formatted message. When the UA decodes a PDCCH payload with the UA's identifier, the UA knows that the resource allocation provided in the PDCCH payload is intended for that UA.

In some cases, a UA might receive an identifier that was not addressed to that UA but that the UA mistakenly identifies as pertaining to itself. The UA might then attempt to transmit data on a resource that the UA mistakenly assumes was allocated to it. Such a false alarm or false detection can waste the UA's computing capacity and battery power.

In an embodiment, these false alarms are limited by limiting the length of time during which a UA attempts to detect and decode the SPS activation/reconfiguration signaling. Specifically, the UA attempts to detect and decode the SPS activation/reconfiguration signaling only during the DRX on-duration portion of the active time. In some embodiments, the UA stops attempting to detect and decode the SPS activation/reconfiguration signaling when the resource allocated to the UA is released. In some embodiments, the UA might begin attempting to detect and decode the SPS activation/reconfiguration signaling only after sending the access device a message requesting that the access device grant an uplink resource to the UA. The message might include a buffer status report or a voice packet.

Figure 1:
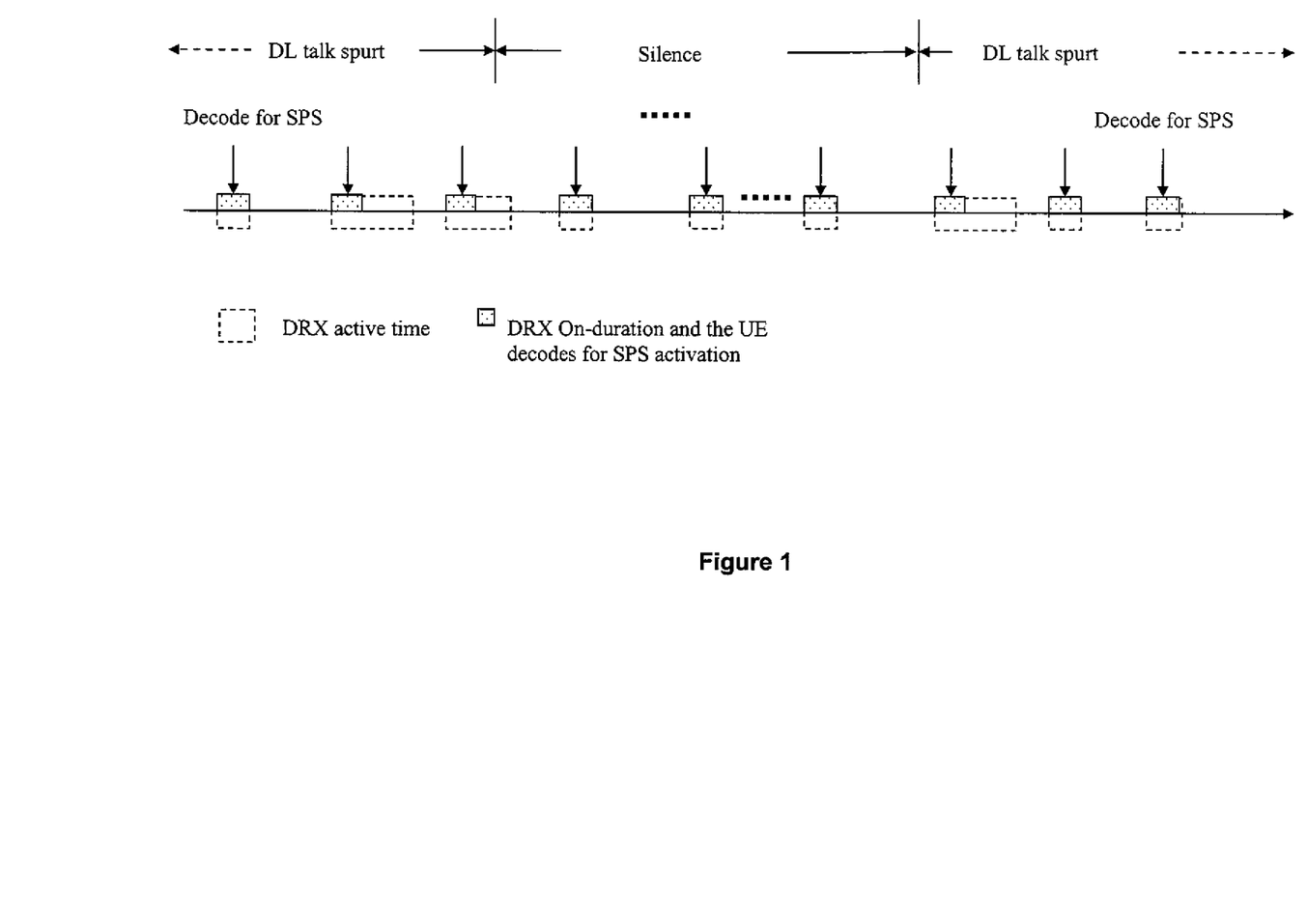
FIG. 1 is an illustration of active times and DRX on-durations according to an embodiment of the disclosure.

FIG. 1 illustrates an embodiment of the limitation of the length of time during which a UA attempts to detect and decode the SPS activation/reconfiguration signaling. It can be seen that, in some cases, the active time is longer than the DRX on-duration. In an embodiment, the UA attempts to detect and decode the SPS activation/reconfiguration signaling only during the DRX on-duration portion of the active time.

That is, when DRX is implemented, an access device typically transmits SPS activation/reconfiguration signaling only during the DRX on-duration. This is typically done at the beginning of a talk spurt for activation and during the talk spurt for reconfiguration. Since the access device does not transmit SPS activation/reconfiguration signaling outside of the DRX on-duration, it is not necessary for the UA to try to detect SPS activation/reconfiguration signaling outside of the DRX on-duration. By limiting the detection time for SPS activation/reconfiguration signaling to only the DRX on-duration, the false alarm probability for SPS activation/reconfiguration may be reduced.

Figure 2:
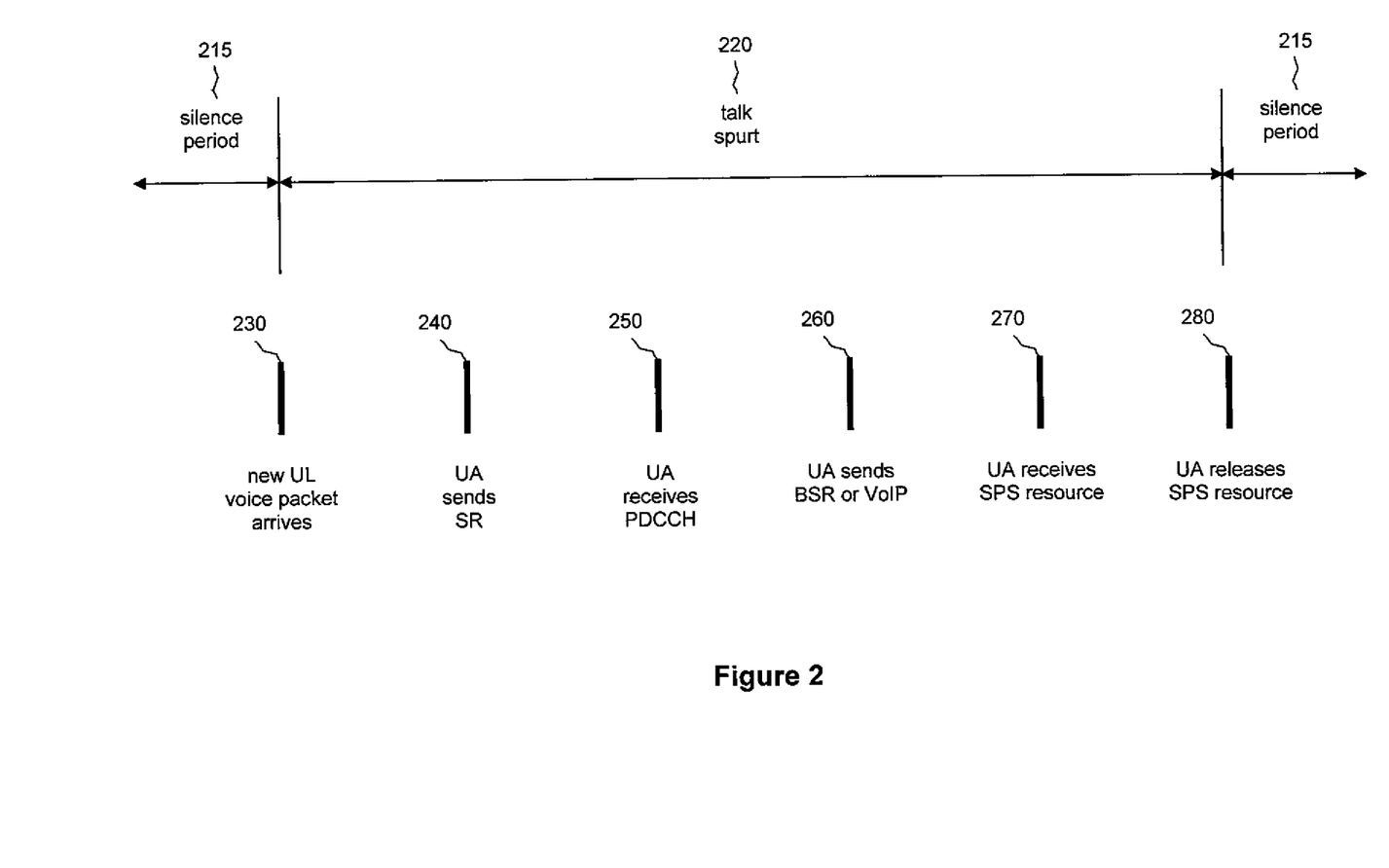
FIG. 2 is an illustration of events in a semi-persistent scheduling activation/reactivation procedure according to an embodiment of the disclosure.

FIG. 2 illustrates a series of events that can occur in the setup of a semi-persistently scheduled uplink resource. The events are represented by vertical lines that are regularly spaced in the drawing even though the events do not necessarily occur at regular intervals. A silence period 215 ends and a talk spurt 220 begins at event 230, when a new uplink voice packet is available at a UA. The arrival of the new uplink voice packet indicates that an uplink transmission from the UA to the access device needs to be established.

When the UA becomes aware that an uplink resource needs to be established, the UA sends a scheduling request to the access device at event 240 to indicate that the UA has data to send to the access device. The scheduling request is typically an indicator, such as a single information bit, that the UA sends to the access device over a scheduling request channel. The scheduling request channel is a dedicated channel between the UA and the access device that is traditionally established specifically for the purpose of providing the UA a channel for requesting resources from the access device. When the UA transmits the indicator on the scheduling request channel, the access device interprets this as a request for an uplink resource that the UA can use to send data to the access device.

At event 250, upon receiving the indicator from the UA, the access device grants the UA a minimal amount of resource capacity via a control message over the PDCCH. This control message contains an identifier for the UA. Upon receiving the control message over the PDCCH, the UA checks the identifier to determine whether the identifier was addressed to the UA.

At event 260, if the identifier in the control message is addressed to the UA, the UA uses the minimal radio resource provided via the control message to send the access device either a buffer status report or a voice packet. The buffer status report or voice packet can inform or imply to the access device the quantity of data and/or the periodicity of the data the UA wishes to send as well as other possible information such as quality of service information. The access device uses this information to determine the quantity of resource capacity the UA will need for the data the UA wishes to send and then periodically grants the appropriate resource. The UA receives the resource at event 270.

At event 280, the talk spurt 220 ends and another silence period 215 begins. The semi-persistently scheduled resource that had been granted to the UA is released at that point, either by the UA or by the access device with which the UA is communicating. In an embodiment, the UA stops attempting to detect and decode the SPS activation/reconfiguration signaling at that point. In some cases, the UA might have begun attempting to detect and decode the SPS activation/reconfiguration signaling after event 260 occurs, where the UA sends the access device a buffer status report or a voice packet. By limiting the length of time during which the UA attempts to detect and decode the SPS activation/reconfiguration signaling, the probability that the UA will falsely detect an identifier that was not addressed to it can be reduced.

Figure 3:
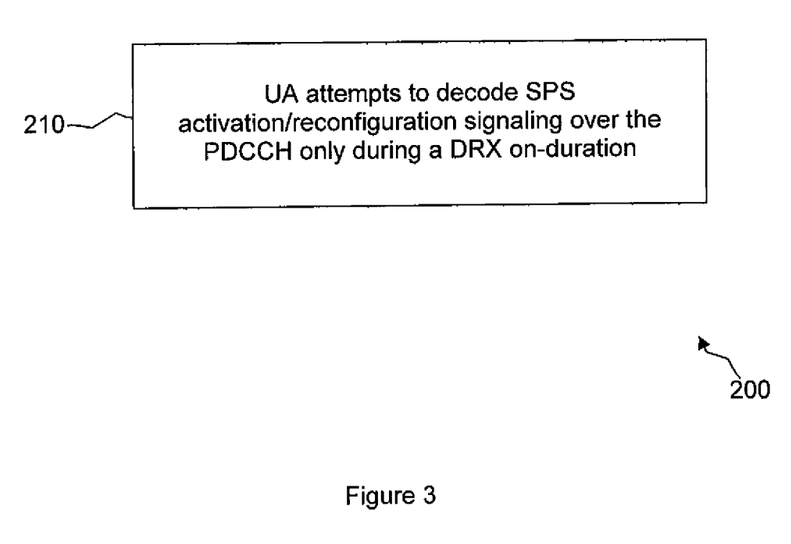
FIG. 3 is a diagram of a method for improving reliability in semi-persistent scheduling activation/reactivation according to an embodiment of the disclosure.

FIG. 3 illustrates an embodiment of a method 200 for improving reliability in the detection of an identifier for a UA during an uplink activation procedure. At block 210, the UA attempts to decode the SPS activation/reconfiguration signaling only during a DRX on-duration. In some cases, the UA might stop attempting to decode the uplink SPS activation/reconfiguration signaling when the resource that the UA is using to communicate with an access device is released. In some cases, the UA might have begun attempting to decode the uplink SPS activation/reconfiguration signaling when the UA sent the access device a buffer status report or a voice packet.

Figure 4:
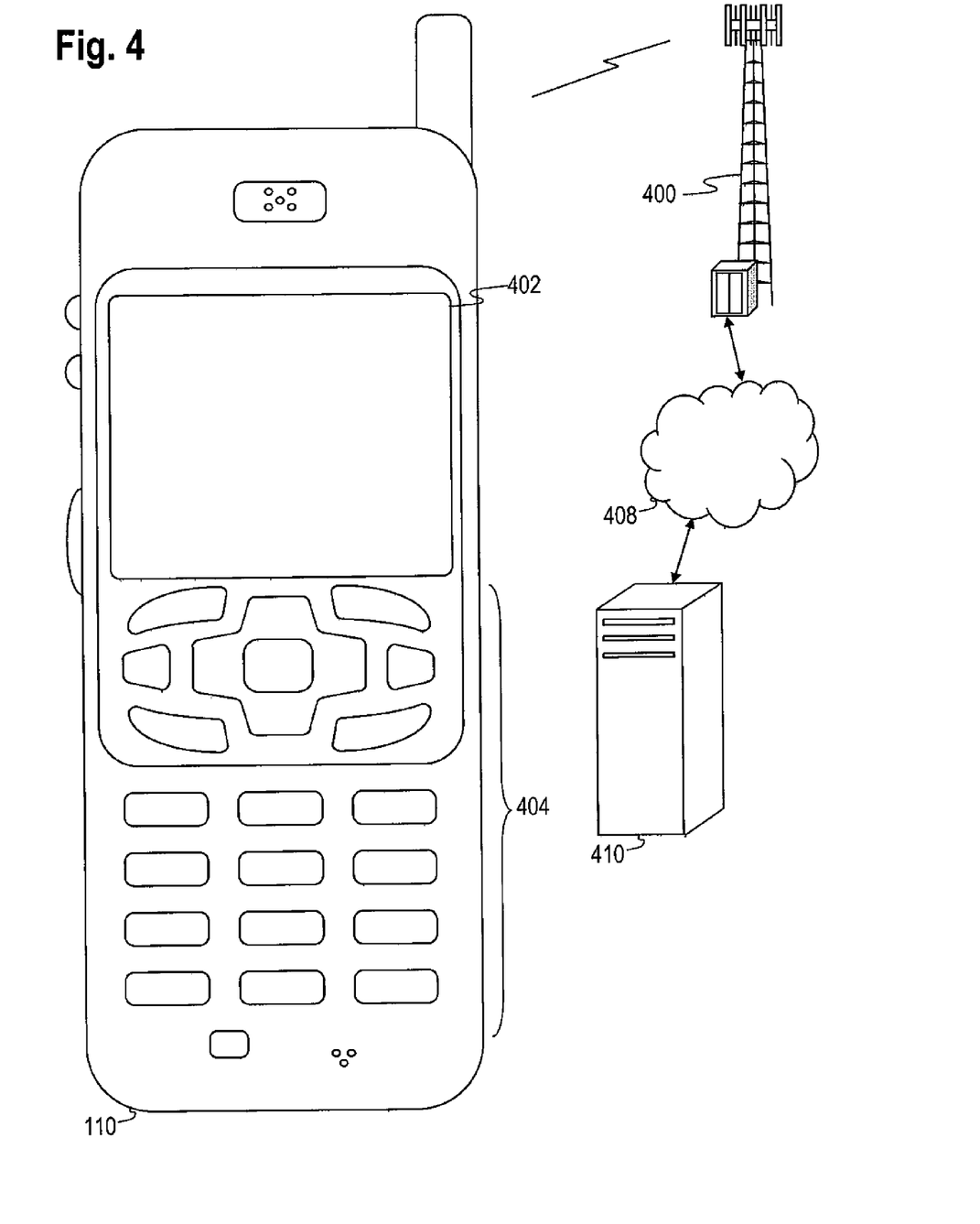
FIG. 4 is a diagram of a wireless communications system including a user agent operable for some of the various embodiments of the disclosure.

FIG. 4 illustrates a wireless communications system including an embodiment of a UA 110. The UA 110 is operable for implementing aspects of the disclosure, but the disclosure should not be limited to these implementations. Though illustrated as a mobile phone, the UA 110 may take various forms including a wireless handset, a pager, a personal digital assistant (PDA), a portable computer, a tablet computer, or a laptop computer. Many suitable devices combine some or all of these functions. In some embodiments of the disclosure, the UA 110 is not a general purpose computing device like a portable, laptop or tablet computer, but rather is a special-purpose communications device such as a mobile phone, a wireless handset, a pager, a PDA, or a telecommunications device installed in a vehicle. In another embodiment, the UA 110 may be a portable, laptop or other computing device. The UA 110 may also be a device, include a device, or be included in a device that has similar capabilities but that is not transportable, such as a fixed line telephone, a desktop computer, a set-top box, or a network node. The UA 110 may support specialized activities such as gaming, inventory control, job control, and/or task management functions, and so on.

The UA 110 includes a display 402. The UA 110 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UA 110 may present options for the user to select, controls for the user to actuate, and/or cursors or other indicators for the user to direct.

The UA 110 may further accept data entry from the user, including numbers to dial or various parameter values for configuring the operation of the UA 110. The UA 110 may further execute one or more software or firmware applications in response to user commands. These applications may configure the UA 110 to perform various customized functions in response to user interaction. Additionally, the UA 110 may be programmed and/or configured over-the-air, for example from a wireless base station, a wireless access point, or a peer UA 110.

Among the various applications executable by the UA 110 are a web browser, which enables the display 402 to show a web page. The web page may be obtained via wireless communications with a wireless network access node, a cell tower, a peer UA 110, or any other wireless communication network or system 400. The network 400 is coupled to a wired network 408, such as the Internet. Via the wireless link and the wired network, the UA 110 has access to information on various servers, such as a server 410. The server 410 may provide content that may be shown on the display 402. Alternately, the UA 110 may access the network 400 through a peer UA 110 acting as an intermediary, in a relay type or hop type of connection.

Figure 5:
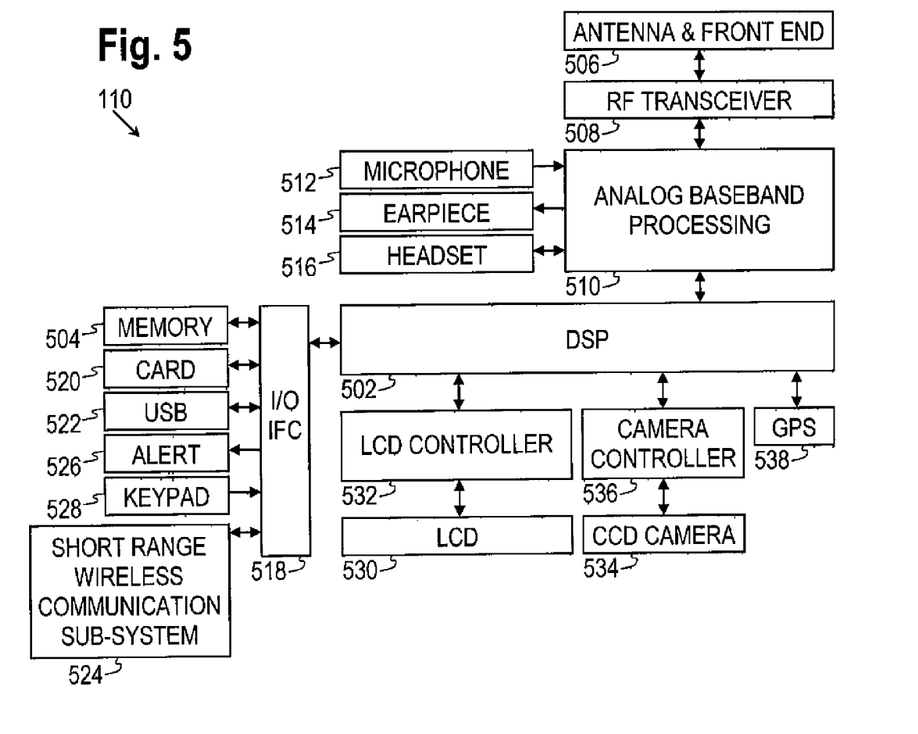
FIG. 5 is a block diagram of a user agent operable for some of the various embodiments of the disclosure.

FIG. 5 shows a block diagram of the UA 110. While a variety of known components of UAs 110 are depicted, in an embodiment a subset of the listed components and/or additional components not listed may be included in the UA 110. The UA 110 includes a digital signal processor (DSP) 502 and a memory 504. As shown, the UA 110 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538. In an embodiment, the UA 110 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the UA 110 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UA 110 to send and receive information from a cellular network or some other available wireless communications network or from a peer UA 110. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the UA 110 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UA 110 and may also enable the UA 110 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UA 110 to communicate wirelessly with other nearby mobile devices and/or wireless base stations.

The input/output interface 518 may further connect the DSP 502 to the alert 526 that, when triggered, causes the UA 110 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the UA 110. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the UA 110 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the UA 110 to determine its position. Various other peripherals may also be included to provide additional functions, e.g., radio and television reception.

Figure 6:
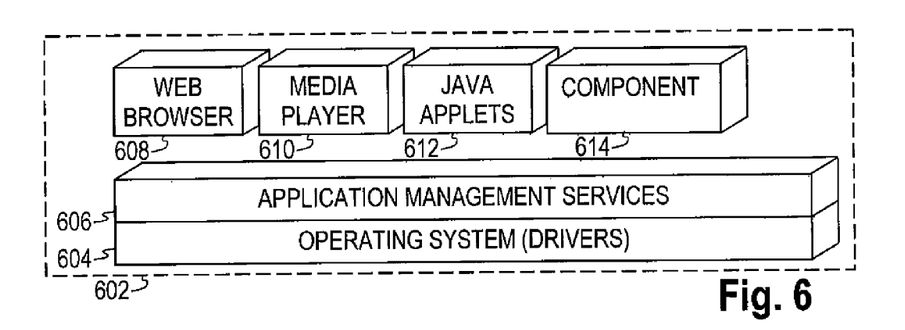
FIG. 6 is a diagram of a software environment that may be implemented on a user agent operable for some of the various embodiments of the disclosure.

FIG. 6 illustrates a software environment 602 that may be implemented by the DSP 502. The DSP 502 executes operating system drivers 604 that provide a platform from which the rest of the software operates. The operating system drivers 604 provide drivers for the UA hardware with standardized interfaces that are accessible to application software. The operating system drivers 604 include application management services ("AMS") 606 that transfer control between applications running on the UA 110. Also shown in FIG. 6 are a web browser application 608, a media player application 610, and Java applets 612. The web browser application 608 configures the UA 110 to operate as a web browser, allowing a user to enter information into forms and select links to retrieve and view web pages. The media player application 610 configures the UA 110 to retrieve and play audio or audiovisual media. The Java applets 612 configure the UA 110 to provide games, utilities, and other functionality. A component 614 might provide functionality described herein.

Figure 7:
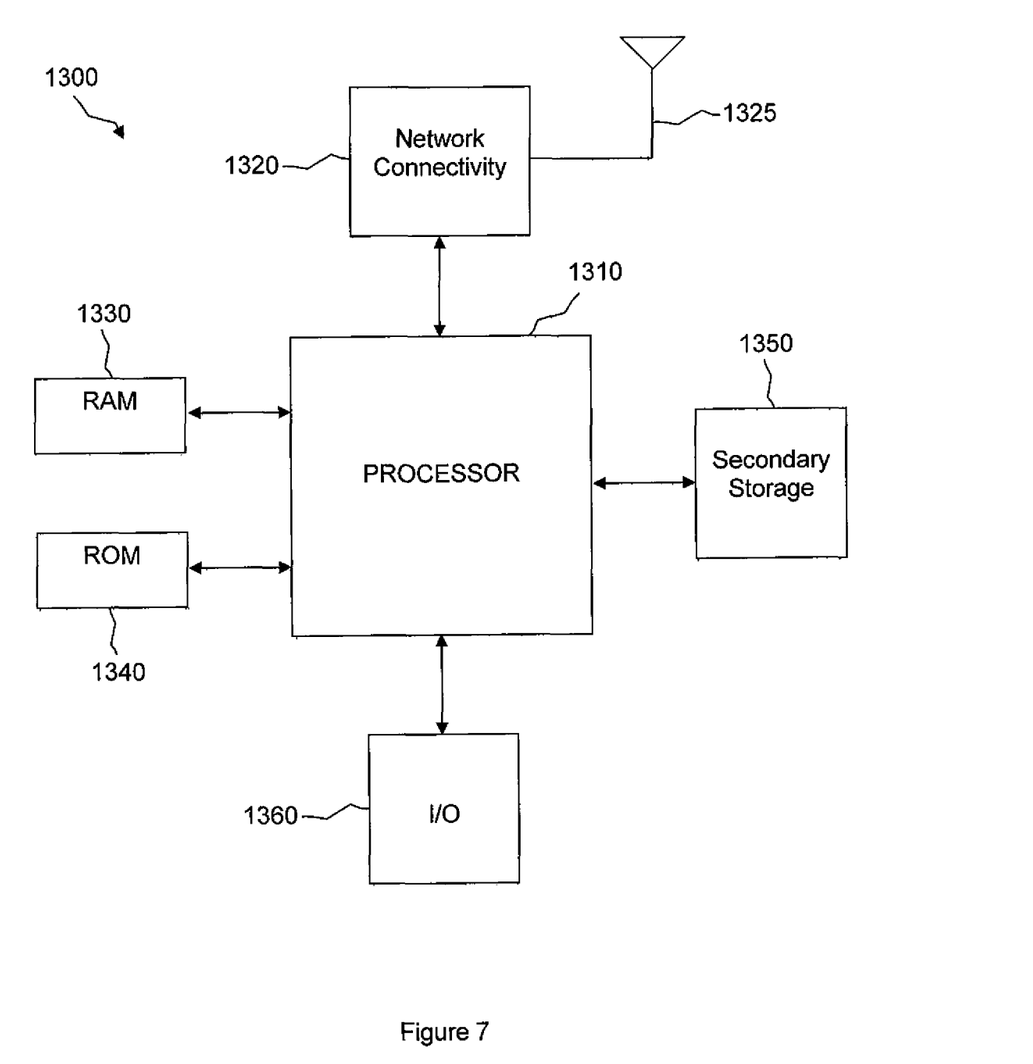
FIG. 7 is an illustrative general purpose computer system suitable for some of the various embodiments of the disclosure.

The UA 110 and other components described above might include a processing component that is capable of executing instructions related to the actions described above. FIG. 7 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one processor 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1325 might be considered to be a component of the I/O devices 1360 instead of or in addition to being a component of the network connectivity devices 1320. Some or all of the I/O devices 1360 may be substantially similar to various components depicted in the previously described drawing of the UA 110, such as the display 402 and the input 404.

The following 3rd Generation Partnership Project (3GPP) Technical Specification (TS) is incorporated herein by reference: TS 36.321.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method performed by a user agent, comprising:
receiving discontinuous reception cycle information;
sending a buffer status report; and
limiting a length of time during which the user agent attempts to decode semi-persistent scheduling (SPS) activation/reconfiguration signaling by attempting to decode the SPS activation/reconfiguration signaling over a physical downlink control channel only after the buffer status report is sent.

2. The method of claim 1, further comprising:
releasing an uplink SPS resource being used by the user agent; and
stopping attempts to detect the SPS activation/reconfiguration signaling after the release.

3. A user agent comprising:
a network connectivity component configured to:
receive discontinuous reception cycle information; and
send a buffer status report; and
a processor component configured to limit a length of time during which the user agent attempts to decode semi-persistent scheduling (SPS) activation/reconfiguration signaling by attempting to decode the SPS activation/reconfiguration signaling over a physical downlink control channel only after a buffer status report is sent.

4. The user agent of claim 3, wherein the user agent stops attempting to decode the SPS activation/reconfiguration signaling when an uplink SPS resource being used by the user agent is released.

5. A method, comprising:
sending discontinuous reception cycle information;
receiving, from a user agent, a buffer status report; and
transmitting, to the user agent, a semi-persistent scheduling (SPS) activation/reconfiguration signaling over a physical downlink control channel only after receipt of the buffer status report; wherein the user agent limits a length of time during which the user agent attempts to decode the SPS activation/reconfiguration signaling by attempting to decode the SPS activation/reconfiguration signaling only after the buffer status report is sent.

6. A system comprising:
an access device including a network connectivity component configured to:
send discontinuous reception cycle information;
receive, from a user agent, a buffer status report; and
transmit, to the user agent, a semi-persistent scheduling (SPS) activation/reconfiguration signaling over a physical downlink control channel only after receipt of the buffer status report; and
the user agent including:
a second network connectivity component configured to:
receive discontinuous reception cycle information; and
send the buffer status report; and
a processor component configured to limit a length of time during which the user agent attempts to decode the SPS activation/reconfiguration signaling by attempting to decode the SPS activation/reconfiguration signaling only after the buffer status report is sent.

* * * * *